United States Patent
Kruse et al.

(10) Patent No.: US 12,532,799 B2
(45) Date of Patent: Jan. 27, 2026

(54) SINGULATOR INSERT FOR 3D SINGULATION AND SEED ORIENTATION

(71) Applicant: Kinze Manufacturing, Inc., Williamsburg, IA (US)

(72) Inventors: Brad Kruse, Williamsburg, IA (US); Matthew Wilhelmi, Williamsburg, IA (US); Stephen Eckert, Williamsburg, IA (US)

(73) Assignee: Kinze Manufacturing, Inc., Williamsburg, IA (US)

( * ) Notice: Subject to any disclaimer, the term of this patent is extended or adjusted under 35 U.S.C. 154(b) by 450 days.

(21) Appl. No.: 18/165,609

(22) Filed: Feb. 7, 2023

(65) Prior Publication Data

US 2023/0247933 A1    Aug. 10, 2023

Related U.S. Application Data

(60) Provisional application No. 63/267,679, filed on Feb. 8, 2022.

(51) Int. Cl.
*A01C 7/04* (2006.01)
*A01C 7/08* (2006.01)

(52) U.S. Cl.
CPC .............. *A01C 7/046* (2013.01); *A01C 7/084* (2013.01)

(58) Field of Classification Search
CPC ........ A01C 7/046; A01C 7/0443; A01C 7/084
See application file for complete search history.

(56) References Cited

U.S. PATENT DOCUMENTS

| | | | |
|---|---|---|---|
| 3,796,346 A | 3/1974 | Ribouleau |
| 4,047,638 A | 9/1977 | Harrer et al. |
| 4,450,959 A | 5/1984 | Sommer |
| 4,469,244 A | 9/1984 | Maury |
| 5,058,766 A | 10/1991 | Deckler |
| 5,121,701 A | 6/1992 | Reed et al. |

(Continued)

FOREIGN PATENT DOCUMENTS

| CN | 106973597 A | 7/2017 |
|---|---|---|
| CN | 106105510 B | 2/2018 |

(Continued)

OTHER PUBLICATIONS

International Search Report and Written Opinion in PCT/US2013/065673, mailed Feb. 6, 2014, 12 pages.

(Continued)

*Primary Examiner* — Theodore N Yao
(74) *Attorney, Agent, or Firm* — McKee, Voorhees & Sease, PLC

(57) ABSTRACT

An agricultural planting implement uses an air seed meter to meter and singulate seeds before directing them towards the field for planting. The air seed meter includes a seed disc that interacts with the seed to aid in planting the seeds at the desired manner so as to provide best spacing between subsequent seeds. To aid the metering and singulation of the seeds, the seed disc includes ramps positioned generally adjacent seed cell apertures. The ramps interact with tufts of a brush singulator to aid in orienting the seed relative to the seed cell aperture to position the seed at the cell and to mitigate multiple seeds from collecting at one or more of the seed cell apertures.

12 Claims, 7 Drawing Sheets

(56) References Cited

U.S. PATENT DOCUMENTS

| | | |
|---|---|---|
| 5,325,801 A | 7/1994 | Fiorido |
| 5,325,880 A | 7/1994 | Johnson et al. |
| 5,392,707 A | 2/1995 | Romans |
| 5,501,366 A | 3/1996 | Fiorido |
| 5,626,090 A | 5/1997 | Thompson et al. |
| 5,842,428 A | 12/1998 | Stufflebeam et al. |
| 5,848,571 A | 12/1998 | Stufflebeam et al. |
| 6,109,193 A | 8/2000 | Crabb et al. |
| 6,516,733 B1 | 2/2003 | Sauder et al. |
| 6,581,535 B2 | 6/2003 | Barry et al. |
| 6,718,892 B1 | 4/2004 | Rosenboom |
| 7,093,548 B2 | 8/2006 | Eben et al. |
| 7,334,532 B2 | 2/2008 | Sauder et al. |
| 7,341,010 B1 | 3/2008 | Friestad et al. |
| 7,377,221 B1 | 5/2008 | Brockmeier |
| 7,404,366 B2 | 7/2008 | Mariman |
| 7,497,175 B2 | 3/2009 | Friestad et al. |
| 7,617,785 B2 | 11/2009 | Wendte |
| 8,281,725 B2 | 10/2012 | Wendte et al. |
| 8,375,873 B2 | 2/2013 | Nelson et al. |
| 8,448,585 B2 | 5/2013 | Wilhelmi et al. |
| 8,511,242 B2 | 8/2013 | Applegate et al. |
| 8,800,457 B2 | 8/2014 | Garner et al. |
| 8,850,998 B2 | 10/2014 | Garner et al. |
| D748,152 S | 1/2016 | Matsushima et al. |
| 9,277,688 B2 | 3/2016 | Wilhelmi et al. |
| D782,549 S | 3/2017 | Takai et al. |
| 9,693,498 B2 | 7/2017 | Zumdome et al. |
| 9,980,426 B2 | 5/2018 | Wilhelmi et al. |
| 10,021,825 B2 | 7/2018 | Haselhoff |
| 10,165,724 B2 | 1/2019 | Nilson et al. |
| D847,868 S | 5/2019 | Wilhelmi et al. |
| D847,871 S | 5/2019 | Ainge et al. |
| D857,063 S | 8/2019 | Pineda |
| D864,258 S | 10/2019 | Andrews |
| D877,207 S | 3/2020 | Anderson et al. |
| 10,660,261 B2 | 5/2020 | Johnson et al. |
| 10,791,668 B2 | 10/2020 | Garner et al. |
| 10,827,662 B2 | 11/2020 | Ruckle et al. |
| 11,140,812 B2 | 10/2021 | Leimkuehler et al. |
| 11,277,961 B2 | 3/2022 | Campbell et al. |
| 11,483,963 B2 | 11/2022 | Johnson et al. |
| 11,490,558 B2 | 11/2022 | Johnson et al. |
| 11,516,958 B2 | 12/2022 | Johnson et al. |
| 11,523,554 B2 | 12/2022 | Buehler |
| 11,523,555 B2 | 12/2022 | Johnson et al. |
| 11,523,556 B2 | 12/2022 | Johnson et al. |
| 11,553,638 B2 | 1/2023 | Johnson et al. |
| 11,553,639 B2 | 1/2023 | Johnson et al. |
| 2005/0252431 A1 | 11/2005 | Kjelsson et al. |
| 2010/0224110 A1* | 9/2010 | Mariman ............ A01C 7/0443 111/11 |
| 2013/0192504 A1 | 8/2013 | Sauder et al. |
| 2014/0109811 A1* | 4/2014 | Wilhelmi ............ A01C 7/121 111/184 |
| 2015/0216115 A1* | 8/2015 | Zumdome ............ A01C 7/20 111/200 |
| 2017/0303463 A1 | 10/2017 | do Amaral Assy et al. |
| 2018/0206397 A1 | 7/2018 | Wilhelmi et al. |
| 2018/0249624 A1 | 9/2018 | Gentili |
| 2019/0021218 A1 | 1/2019 | Sheppard et al. |
| 2019/0098828 A1* | 4/2019 | Wilhelmi ............ A01C 7/046 |
| 2020/0000010 A1 | 1/2020 | Jagow et al. |
| 2020/0359558 A1 | 11/2020 | Donadon et al. |
| 2022/0151137 A1 | 5/2022 | do Amaral Assy et al. |
| 2022/0264787 A1 | 8/2022 | Nolte |
| 2022/0354046 A1 | 11/2022 | do Amaral Assy |

FOREIGN PATENT DOCUMENTS

| | | |
|---|---|---|
| CN | 109392377 A | 3/2019 |
| CN | 109699249 A | 5/2019 |
| CN | 111183770 A | 5/2020 |
| CN | 110199632 B | 5/2021 |
| CN | 108811625 B | 7/2021 |
| CN | 110199633 B | 7/2021 |
| CN | 112042334 B | 9/2021 |
| CN | 111684898 B | 12/2021 |
| CN | 112438098 B | 2/2022 |
| CN | 114009187 A | 2/2022 |
| CN | 114190142 A | 3/2022 |
| DE | 102015010519 A1 | 2/2017 |
| DE | 102015217701 A1 | 3/2017 |
| EP | 3136834 A4 | 1/2018 |
| FR | 2971391 B1 | 2/2014 |
| RU | 2050092 C1 | 12/1995 |
| RU | 2123248 C1 | 12/1998 |
| RU | 2267246 C2 | 1/2006 |
| RU | 2343675 C1 | 1/2009 |
| RU | 2737974 C1 | 12/2020 |
| WO | 2019108881 A1 | 6/2019 |
| WO | WO-2020049426 A1 * | 3/2020 ............ A01C 7/046 |

OTHER PUBLICATIONS

Sauder, Derek A., "Seed Meter," U.S. Appl. No. 61/466,047, filed Mar. 22, 2011, 8 pages.

International Preliminary Report on Patentability in PCT/US2023/062112, mailed Aug. 22, 2024, 12 pages.

International Search Report and Written Opinion in PCT/US2023/062112, mailed Jun. 1, 2023, 18 pages.

* cited by examiner

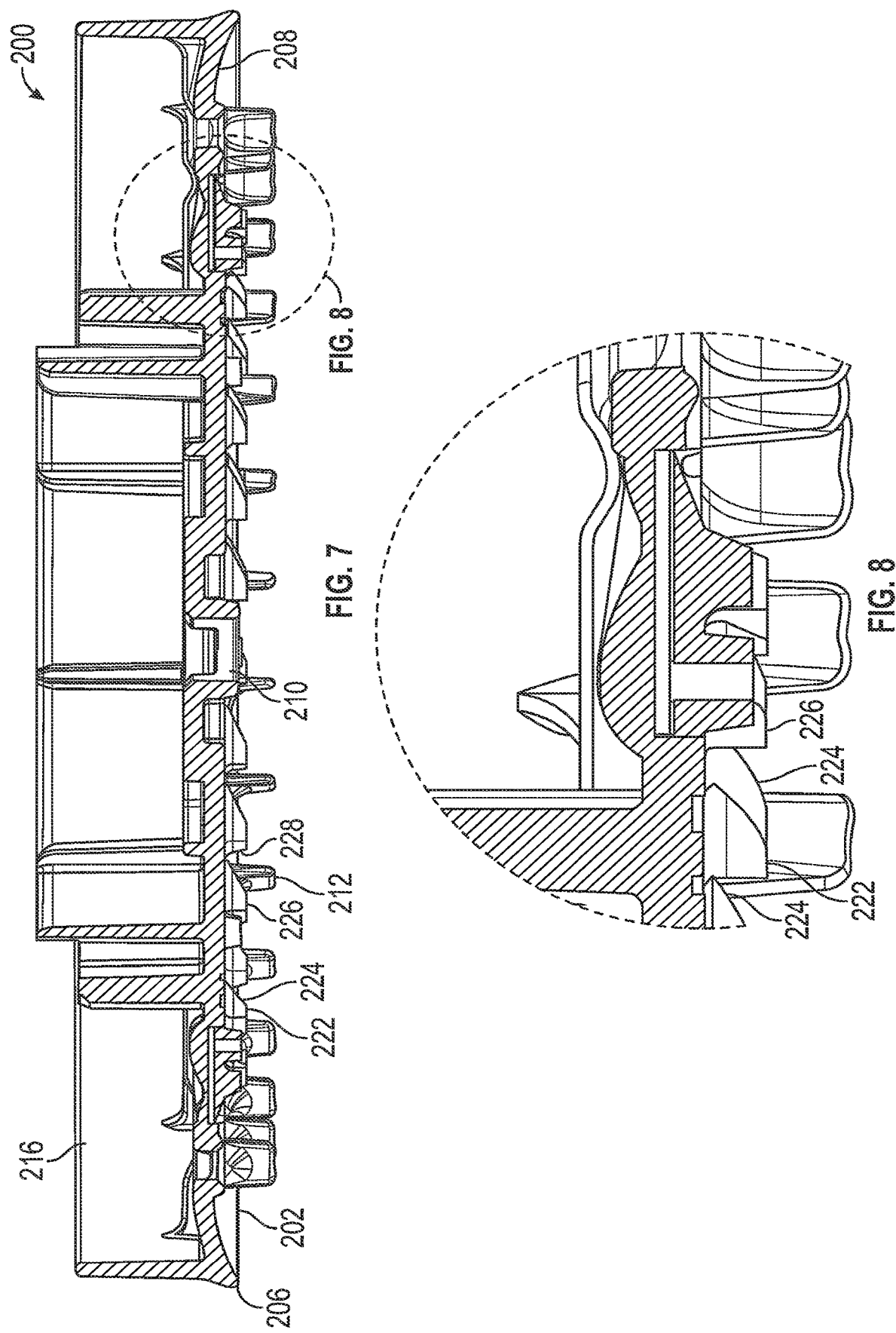

SINGULATOR INSERT FOR 3D SINGULATION AND SEED ORIENTATION

CROSS REFERENCE TO RELATED APPLICATIONS

This application claims priority under 35 U.S.C. § 119 to provisional patent application U.S. Ser. No. 63/267,679, filed Feb. 8, 2022. The provisional patent application is herein incorporated by reference in its entirety, including without limitation, the specification, claims, and abstract, as well as any figures, tables, appendices, or drawings thereof.

FIELD OF THE INVENTION

The invention relates generally to an apparatus and/or corresponding method of use in at least the agricultural industry. More particularly, but not exclusively, the invention is directed towards improvements in the singulation and metering of seed and other particulate for planting, such as by orienting the seed during metering for better singulation.

BACKGROUND OF THE INVENTION

An agricultural row crop planter is a machine built for precisely distributing seed into the ground. The row crop planter is an agricultural implement that is towed by a tow vehicle (e.g., a tractor) and generally includes a horizontal toolbar fixed to a hitch assembly for towing behind a tractor. Row units are mounted to the toolbar. In different configurations, seed may be stored at individual hoppers on each row unit, or it may be maintained in a central hopper and delivered to the row units on an as needed basis. The row units include ground-working tools for opening and closing a seed furrow, and a seed metering system for distributing seed to the seed furrow.

The seed metering system generally includes a seed meter including a housing with one or more seed discs rotating therein. Seed is metered and singulated within the housing, such that a single seed is positioned at a seed cell of the seed disc. The seed at the cell of the disc is rotated to a point of release or removal, at which point the seed is directed towards, a feature such as a furrow created in the ground for planting. The rotational velocity of the disc, along with the singulating of the seeds, provides for desired spacing between subsequent seeds during planting, adjusted for ground speed of the planter and/or tow vehicle pulling the planter.

Seed meters are often air seed meters, in which a difference in pressure is applied on opposite sides of the meter in order to hold the seed in place at a cell, which is an aperture extending through the seed disc. Positive pressure seed meters utilize a positive pressure on the seed side of the seed disc to hold the seed in place until it is to be directed towards the ground. In negative systems (also known as vacuum meters), a negative pressure is provided on a side of the disc opposite the seed side, which holds the seed in place until directed towards the ground.

Most seed cell apertures are circular to account for the various sizes and shapes of seeds. However, as the seeds are not ideally shaped for the circular seed cells, issues can arise while attempting to hold the seed at the aperture before planting. In addition, multiple seeds can become held at a single seed cell, which creates multiple seeds being distributed to the ground, which can affect the yield of the resulting crop.

To aid in this issue, singulators are provided in seed meters. Singulators can take many forms, including, but not limited to, brushes, blades, ramps, protrusions, or some combination thereof, and are used to mitigate multiple seeds being held at a single seed cell aperture. However, some seeds still create issues. Small, flat seeds, such as sunflower seeds, corn, cotton, edible beans, and the like, are difficult to singulate due to their geometries. If the seeds are oriented in certain ways, the singulators may not be able to knock off or otherwise ensure that a single seed is positioned at a single seed cell. To best singulated these and other irregularly shaped seeds, it may be beneficial to interact with the seeds in three dimensions, which can orient the seeds at or prior to singulation.

Thus, there exists a need in the art for a system, method, and/or apparatus that can impose singulation forces in three dimensions to the seeds in a seed meter as they are held to a seed disc at or near a seed singulator to better mitigate multiple seeds from being held at the single seed cell.

SUMMARY OF THE INVENTION

The following objects, features, advantages, aspects, and/or embodiments, are not exhaustive and do not limit the overall disclosure. No single embodiment need provide each and every object, feature, or advantage. Any of the objects, features, advantages, aspects, and/or embodiments disclosed herein can be integrated with one another, either in full or in part.

It is a primary object, feature, and/or advantage of the invention to improve on or overcome the deficiencies in the art.

It is a further object, feature, and/or advantage to orient irregularly shaped seeds relative to seed cell apertures of a seed disc.

It is still yet a further object, feature, and/or advantage of the invention to mitigate seed multiples at the seed cell apertures.

It is yet another object, feature, and/or advantage to improve the singulation of irregularly shaped seeds by orienting the same prior to or during singulation to provide better connection at the seed cell apertures.

It is still another object, feature, and/or advantage to provide an apparatus that can be made integral with a seed disc, or can be a separate insert that is added to an existing seed disc to provide any of the advantages provided herein or would be otherwise obvious to those skilled in the art.

The systems, methods, and/or apparatus disclosed herein can be used in a wide variety of applications. For example, the improvements can be used with many types of seeds or other particulate delivery systems and can be used with different types of seed discs and/or meters.

It is preferred the apparatus be safe, cost effective, and durable. The seed disc and associated ramps used to orient the seeds will be used many times, and thus, will need to be made to last.

At least one embodiment disclosed herein comprises a distinct aesthetic appearance. Ornamental aspects included in such an embodiment can help capture a consumer's attention and/or identify a source of origin of a product being sold. Said ornamental aspects will not impede functionality of the invention.

According to some aspects of the present disclosure, a seed disc for use with an air seed meter includes a circular member comprising a seed side and a pressure side and having an axis for rotation, a plurality of radially spaced seed cell apertures comprising a seed path and extending from the seed side to the pressure side, and a plurality of ramps radially inward of the seed path and spaced about the axis, the plurality of ramps extending axially from the seed side of the circular member.

According to at least some aspects of some embodiments, the number of ramps is equal to the number of seed cell apertures.

According to at least some aspects of some embodiments, each of the plurality of ramps comprises a rise, a landing, and a rear face, wherein the rise faces a direction of rotation of the disc.

According to at least some aspects of some embodiments, the rear face comprises a steeper angle relative to the face of the seed disc than the rise.

According to at least some aspects of some embodiments, the disc also includes a curved portion radially external to the seed path on the seed side of the circular member.

According to at least some aspects of some embodiments, the disc also includes a plurality of seed projections extending axially from the seed side of the circular member, said seed projections positioned between subsequent seed cell apertures.

According to at least some aspects of some embodiments, the plurality of ramps are integral with the circular member.

According to at least some aspects of some embodiments, the plurality of ramps comprise a ring insert that is removably attachable to the seed side of the circular member.

According to additional aspects, an air seed meter comprises a housing with an air pressure side and a seed side, a seed disc rotatably positioned in the housing, the seed disc comprising a circular member comprising a seed side and a pressure side and having an axis for rotation, a plurality of radially spaced seed cell apertures comprising a seed path and extending from the seed side to the pressure side, and a plurality of ramps radially inward of the seed path and spaced about the axis, the plurality of ramps extending axially from the seed side of the circular member; and a brush singulator comprising at least one tuft extending radially outward from the seed dis axis, the at least one tuft configured to interact with the plurality of ramps to singulate seed at the seed cell apertures.

According to at least some aspects of some embodiments, the air seed meter further includes a vacuum source operatively connected to the pressure side of the housing.

According to at least some aspects of some embodiments, the air seed meter further includes an electric motor operatively connected to the seed disc to rotate the seed disc in the housing.

According to at least some aspects of some embodiments, the seed disc further comprises a curved portion radially external to the seed path on the seed side of the circular member.

According to at least some aspects of some embodiments, the curved portion extends axially away from the seed side of the circular member of the seed disc.

According to at least some aspects of some embodiments, the number of ramps is equal to the number of seed cell apertures.

According to at least some aspects of some embodiments, the plurality of ramps are integral with the circular member.

According to additional aspects, a row unit for use with an agricultural planting implement comprises an air seed meter comprising a housing; a seed disc rotatably positioned in the housing, the seed disc comprising: a circular member comprising a seed side and a pressure side and having an axis for rotation; a plurality of radially spaced seed cell apertures comprising a seed path and extending from the seed side to the pressure side; a curved portion radially external the plurality of seed cell apertures; and a plurality of ramps radially can be radially inward, outboard, or both of the seed path and spaced about the axis, the plurality of ramps extending axially from the seed side of the circular member; a brush singulator in the seed meter housing and comprising at least one tuft extending radially outward from the seed dis axis, the at least one tuft configured to interact with the plurality of ramps to singulate seed at the seed cell apertures; a rotating brush in communication with the curved portion of the seed disc to receive seeds from the seed meter; and a conveyor in communication with the rotating brush to receive seeds from the rotating brush, the conveyor ejecting the seeds proximate to the ground with a horizontal velocity component being approximately zero relative to the ground.

According to at least some aspects of some embodiments, the seed disc rotates about a seed disc axis that is generally aligned with a direction of travel for the row unit; and the rotating brush rotates about a brush axis that is generally horizontal and transverse to the seed disc axis.

According to at least some aspects of some embodiments, the conveyor comprises a flighted belt within a conveyor cover.

According to at least some aspects of some embodiments, the seed disc further comprises a substantially planar portion extending from a central axis and radially to the curved portion.

According to at least some aspects of some embodiments, the number of ramps is equal to the number of seed cell apertures.

These and/or other objects, features, advantages, aspects, and/or embodiments will become apparent to those skilled in the art after reviewing the following brief and detailed descriptions of the drawings. Furthermore, the present disclosure encompasses aspects and/or embodiments not expressly disclosed but which can be understood from a reading of the present disclosure, including at least: (a) combinations of disclosed aspects and/or embodiments and/or (b) reasonable modifications not shown or described.

BRIEF DESCRIPTION OF THE DRAWINGS

Several embodiments in which the invention can be practiced are illustrated and described in detail, wherein like reference characters represent like components throughout the several views. The drawings are presented for exemplary purposes and may not be to scale unless otherwise indicated.

FIG. 7 is a sectional view of the seed disc of FIG. 5 taken along lines 7-7.

FIG. 8 is an enlarged view of a portion of FIG. 7.

Figure 1:
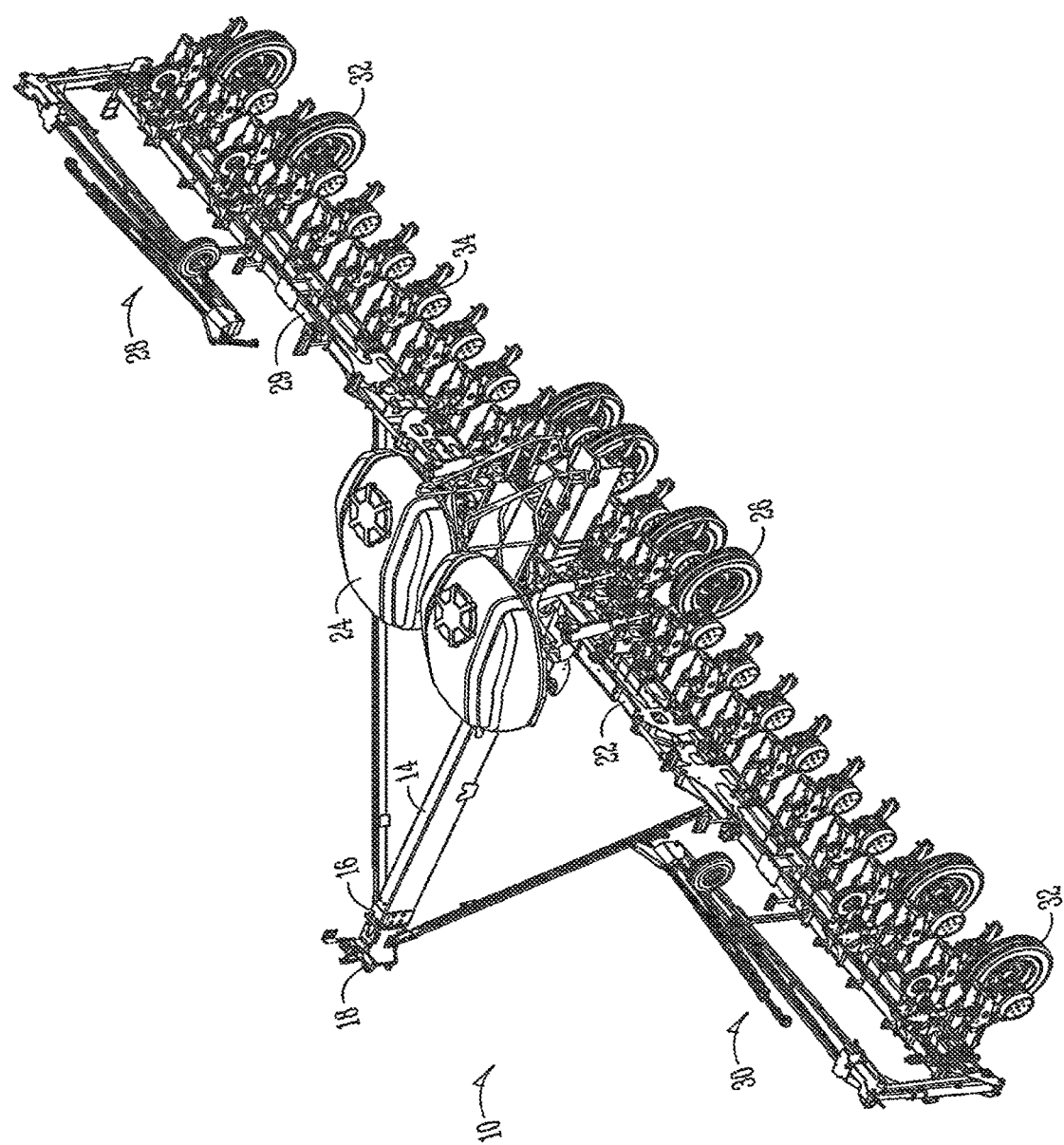
FIG. 1 is an isometric view of an agricultural planting implement.

An artisan of ordinary skill need not view, within isolated figure(s), the near infinite number of distinct permutations of features described in the following detailed description to facilitate an understanding of the invention.

DETAILED DESCRIPTION OF THE INVENTION

The present disclosure is not to be limited to that described herein. Mechanical, electrical, chemical, procedural, and/or other changes can be made without departing from the spirit and scope of the invention. No features shown or described are essential to permit basic operation of the invention unless otherwise indicated.

Unless defined otherwise, all technical and scientific terms used above have the same meaning as commonly understood by one of ordinary skill in the art to which embodiments of the invention pertain.

The terms "a," "an," and "the" include both singular and plural referents.

The term "or" is synonymous with "and/or" and means any one member or combination of members of a particular list.

The terms "invention" or "present invention" are not intended to refer to any single embodiment of the particular invention but encompass all possible embodiments as described in the specification and the claims.

The term "about" as used herein refer to slight variations in numerical quantities with respect to any quantifiable variable. Inadvertent error can occur, for example, through use of typical measuring techniques or equipment or from differences in the manufacture, source, or purity of components.

The term "substantially" refers to a great or significant extent. "Substantially" can thus refer to a plurality, majority, and/or a supermajority of said quantifiable variable, given proper context.

The term "generally" encompasses both "about" and "substantially."

The term "configured" describes structure capable of performing a task or adopting a particular configuration. The term "configured" can be used interchangeably with other similar phrases, such as constructed, arranged, adapted, manufactured, and the like.

Terms characterizing sequential order, a position, and/or an orientation are not limiting and are only referenced according to the views presented.

The "scope" of the invention is defined by the appended claims, along with the full scope of equivalents to which such claims are entitled. The scope of the invention is further qualified as including any possible modification to any of the aspects and/or embodiments disclosed herein which would result in other embodiments, combinations, subcombinations, or the like that would be obvious to those skilled in the art.

The term "agricultural equipment" encompasses any type of machinery associated with the agriculture industry. For example, both agricultural vehicles and agricultural implements are encompassed by the term "agricultural equipment".

The term "particulate material" shall be construed to have a broad meaning, and includes, but is not limited to grain, seed, fertilizer, insecticide, dust, pollen, rock, gravel, dirt, stock, or some combination thereof. Particulate material can be mixed with air to form airborne matter.

FIG. 1 shows an agricultural implement 10, in this case, an agricultural planter. The planter 10 is usually attached to and pulled by a tractor. However, it should be appreciated that other equipment and/or vehicles may move the implement 10. For purposes of the present disclosure, the implement 10 will be referred to as a planter. Planter may be self-contained and not be towed, such as an autonomous unit.

The planter 10 includes a tongue 14 having a first end 16 and an opposite second end (not shown). The tongue 14 includes a hitch 18 at the first end 16, with the hitch 18 being connected to the tractor. At the opposite end of the tongue 14 is a central tool bar 22. The tongue 14 may be a telescoping tongue with components capable of being inserted into one another such that the implement 10 is a front folding style implement. However, the present invention is not to be limited to such front folding style implements and is to include any such implement for use in the agricultural industry.

Figure 3:
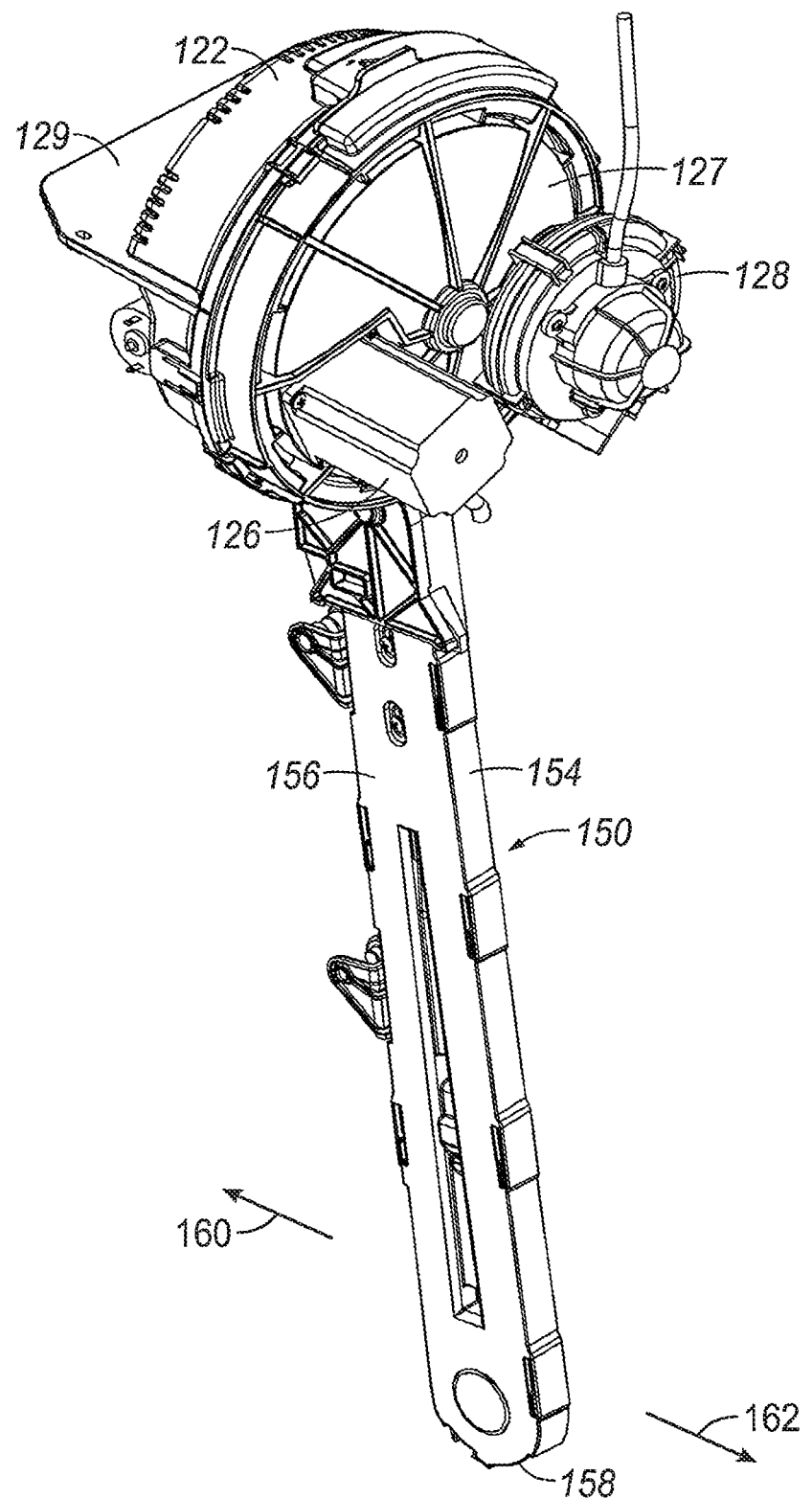
FIG. 3 is an isometric view of a seed meter and seed to ground delivery system.

As shown in FIG. 1, central hoppers 24 are positioned at the central toolbar 22. The hoppers 24 are configured to store seed, fertilizer, insecticide, or other types of material for use in farming. The hoppers 24 may both contain the same material or could contain separate materials. The use of the central hoppers 24 allows for a large amount of material to be added and stored at a centralized location. However, the invention also contemplates the use of one or more hoppers positioned at each of the row units 34 for providing seed to be planted at the row units, as is shown in FIG. 3. When central hoppers 24 are used at the central toolbar 22, it should be appreciated that the central hoppers will be in fluid communication with each of the row units 34. This can be done by use of separate hoses to each of the row units, or fewer hoses that include splitters, wherein the hose is split to provide seed or other material to more than one row unit. Also connected to the central toolbar is a plurality of central wheels, which may be known as transport wheels 26 extending generally downwardly from the central toolbar 22. The wheels 26 contact the ground and support the central hoppers 24. The wheels stabilize the implement 10 and are the wheels that contact the ground when in a working position or a transport position, e.g., if the implement 10 is a front folding implement such that the wings 28, 30 are folded forward with wing wheels 32 not contacting the ground.

Extending generally from both sides of the toolbar 22 are first and second wings 28, 30. The wings 28, 30 are generally identical and mirror images of one another. Therefore, only one wing will be described with the understanding that the other wing will be generally the same configuration. The first wing 28 includes a bar 29. Mounted to the bar 29 are a plurality of row units 34, as well as a plurality of wheels 32. The wheels 32 are configured to contact the ground. The row units 34 may be seeders, fertilizers, insecticide sprayers, or other dispensers, discs, or plows. The wings 28, 30 may also include at least one fold cylinder and a down force cylinder. It is further contemplated that multiple down force cylinders be used with an implement having more sections. The fold cylinder(s) is configured to fold the wings to a position wherein the first and second wings 28, 30 are generally adjacent the tongue 14 of the implement 10.

Figure 2:
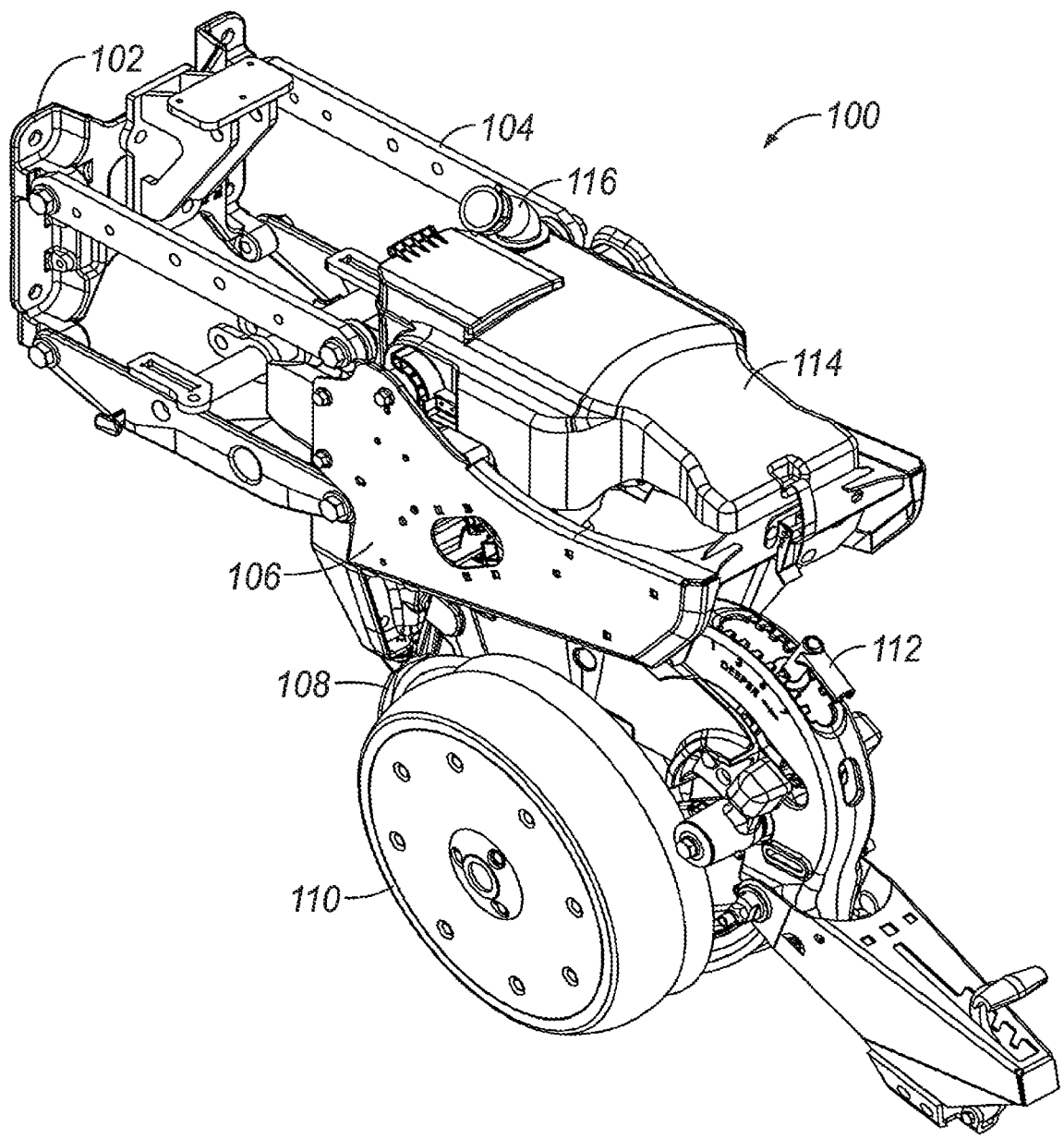
FIG. 2 is an isometric view of a row unit for use with an agricultural planting implement, such as that shown in FIG. 1.

FIG. 2 discloses a row unit 100 according to and including aspects of the invention. The row unit 100 includes a plate 102 or other member for attaching the row unit 100 to a toolbar of a planting implement. Extending generally from the faceplate 102 is a linkage 104, which allows for some vertical movement of the row unit 100 relative to other row units and components of the planting implement. While not shown, a system, apparatus, and/or assembly for providing down and/or up force for the row unit may also be included for use with the row unit. Such a system is shown and described in U.S. patent application Ser. No. 16/047,236, which is hereby incorporated by reference in its entirety. A frame 106 is also included. The row unit 100 includes opening elements 108, which are in the form of opening or coulter wheels in the figures. Gage wheels 110, a depth adjustment system 112, and a sensor are included to adjust the depth of the furrow created and to sense and adjust an amount of supplemental down and/or up force for the row unit.

Connected to the frame 106 is a hopper attachment 114, which may also be referred to as a mini hopper. The attached 114 includes, in part, a lid portion, a receptacle portion, and a conduit attachment 116. The conduit attachment 116 can be attached, via delivery system, to one or more bulk hoppers of the planting implement to receive on-demand amounts of seed for the row unit. The seed can be stored, at least temporarily, at or in the attachment 114, where it can then be fed into a seed meter seed pool for singulation and delivery to the ground.

Additional aspects of a seed meter and/or seed delivery system are included in U.S. Pat. No. 10,842,072, which is hereby incorporated by reference in its entirety. For example, as disclosed in the '072 patent, a seed meter will receive seed via the conduit and temporarily store the seed at a seed pool within a housing of the meter. A disc rotating within the housing will interact with the seed in the pool, and a pressure differential at seed apertures in and through the disc will cause the seed to adhere at the apertures of the disc. It is noted that the entire second side of the seed disc will be pressurized, and there will be no areas where the pressure difference is cut-off. The seed will travel on the disc until it is dislodged by a combination of a seed knock-off and a brush wheel, which are on opposites side of the seed disc, as will be disclosed herein. The seed will be transported via the brush wheel at a higher rotational velocity than the rotating speed of the disc to a point where the seed will be delivered towards a belt. The belt includes spaced flights, which will provide a controlled delivery towards a release point. The belt will have a velocity that is synced with the ground speed at the row unit such that the seed will be released from the belt and delivery system with a horizontal velocity component that is equal to said ground speed in an opposite direction so that the seed is release with zero relative velocity, which will mitigate bounce, roll, or other movement of the seed when it contacts the ground.

Therefore, the seed meter according to aspects and/or embodiments of the present disclosure, such as the seed meter 120 and seed to ground delivery system 150 shown in FIG. 3, may be similar to that shown and described in the '072 patent. As noted, the seed meter 120 includes a disc 200 within a housing 122. The housing 122 may be a one-piece or multi-component housing in which the components are attached to one another, such as by snapping together, clasping, of otherwise affixing temporarily or selectively to one another. For example, in some embodiments, the housing 122 may include a pressure side 127 and a seed side 129. The pressure side 127 can include a connection for a pressure source, such as a vacuum, fan, blower, or the like. In the embodiments shown, the pressure source is a dedicated or otherwise integrated fan 128 that is positioned on the housing 128. The integration of the fan 128 at the seed meter provide numerous advantages, such as individual control for each seed meter of each row unit, greater efficiency, reduction of hoses/conduits for the planter, etc. Additional advantages and description of integrating a fan 128 to the meter housing 122 are shown and described in U.S. Pat. No. 9,763,380, which is hereby incorporated by reference in its entirety. The fan 128 can include a rotating member rotating at a high speed to create a pressure differential at the seed meter and can convey the pressure to within the housing via a cutout, aperture, conduit, or the like. The fan 128 can be electrically connected to a source that provides electric power thereto in order to operate. Additionally, the fan can be connected to a processing unit, central processor, or other computing member to provide commands and/or control of the fan at each of the seed meters at each of the row units. Still further, it should be appreciated that a pressure source, such as a hydraulic fan or the like could be positioned along the implement, such as at a toolbar to provide pressure for more than one row unit at a given time.

Also shown at the pressure side of the housing 122 is an electric motor 126. The motor 126 is used to provide rotational power to the seed disc 200 inside the housing. The electric motor 126 will also be connected to the central processor/control to provide a rotational velocity that is based, in part, on the seed type, population input, ground speed at the row unit, spacing, and other inputs related to planting. The inputs could be inputted to, reviewed, and updated via a central processor and display, such as is disclosed in co-owned U.S. Ser. No. 16/420,816, which is hereby incorporated by reference in its entirety.

Opposite the pressure side 127 of the housing 122 is the seed side 129. The seed side includes a pool or a passage for seed to be delivered to a pool for the seed meter. The housing members may comprise a rigid polymer such as plastic or the like, and can be configured to reduce static energy of the components, such as by including one or more grounds. Alternatively, the disc can be manufactured from statically dissipative materials.

Positioned adjacent to and operatively connected to the seed meter housing 122 is the seed to ground system 150 and components. The components include the brush wheel and housing thereof. As will be understood, the brush wheel comprises a plurality of bristles extending from an axis that are pliable and resilient to be deformed to receive a seed to transfer the seed from the seed disc 200 to the belt 154. The housing can also be a rigid material, such as a plastic.

Attached to and extending from the brush wheel housing is the housing 156 for the belt 154. The belt housing 156 is an elongated member, comprising a rigid material, that is used to house the belt 154 and other components therein. The belt housing 156 can be unitary or multi-component, in which the components are attached to another to allow selective access to the interior thereof. An opening 158 is positioned at or near the bottom of the housing 156 to coincide with the release point wherein the seed is released from the belt and directed towards the furrow for planting.

As shown in FIG. 3, the seed meter 120 will be generally transverse to the direction of travel, as shown by the arrow 160. In addition, the release of the seed at the release or dispensing point 158 will be in a direction generally opposite that of the direction of travel (shown by the right facing arrow 162 in FIG. 3). The release of the seed will include a horizontal and vertical velocity component, wherein the horizontal velocity component is generally equal and opposite to the velocity of the row unit.

As noted, the seed meter 120 includes a seed disc 200 therein. A seed disc, as is known, is used in conjunction with other members to meter the seeds to deliver the seeds toward the ground for planting. The seed disc is used to provide the desired number of seed with appropriate spacing. For example, some crops require a single seed to be placed in the ground and spaced an appropriate distance from subsequent seeds (e.g., corn). Other seeds can be grouped or otherwise dispensed in plural form to control the population of seed being distributed to the ground about a given area (e.g., soybeans).

In any sense, the seeds are generally held in place at a seed cell, such as the seed cell aperture 210 shown in the figures, by a difference in pressure. This is either a positive pressure or a negative (i.e., vacuum) pressure. As seeds are generally not the ideal shape for the seed cell apertures, there is a chance that the seed may not be properly held at the aperture, or that multiple seeds may be held at a single aperture, which is not desired. Therefore, many seed meters include seed singulators. Seed singulators are positioned at a location in the seed meter to interact with seed that is being held at a seed cell aperture (i.e., after the seed is held under pressure). The singulator is configured to interact with the seed at the seed cell aperture to mitigate plural seeds from being held at a single aperture. The seed singulators can take many shapes and forms, such as blades, brushes, fingers, or the like. Therefore, as will be appreciated, the seed disc 200 disclosed herein will aid in the operation of positioning a seed at a seed cell aperture 210 to improve planting practices.

As shown in FIGS. 4-8, a seed disc 200 comprises a generally circular body member 201. The disc 200 includes a seed side 202 that interacts with seed, and an opposite air or pressure side 216 that is in direct communication with the pressure source (i.e., fan or vacuum). The circular member 201 has an axis 204 about which the disc rotates. The axis 204 may include an aperture for receiving a rotational member, such as a motor output that is used to rotate the disc 200. As shown, the axis is a central axis. Extending radially from the axis 204 is a generally planar portion 218.

Positioned a radial distance from the axis 204 are a plurality of seed cell apertures 210 in a circular path, thus creating a seed path. The seed cell apertures 210 extend from the seed side 202 to the air side 216. The aperture allows for the pressure difference to be created thereat to hold a seed at the seed cell 210. The number and size of seed cells 210 may vary according to the type of seed, population requirements, speed of planting, type of manufacture, and other planting considerations. However, it should be appreciated that the exact number and/or configuration of the seed cells should not be limiting to the present disclosure.

Positioned generally between subsequent seed cell apertures 210 are seed projections 212. The seed projections provide staging for the seed to aid in positioning the seed at or near the aperture as the seed is introduced to the pressure differential. This will aid in a seed being held at an aperture. For example, the disc 200 will be rotated, such as the direction of the arrow 164 in FIG. 5. The seed side 202 will interact with seed in a seed pool (not shown). The projections will aid in staging the seed at a seed cell 210. As the disc 200 continues to rotate, the staging and pressure difference at the seed cell 210 will position a seed at the cell. The disc will continue rotation until a point of release or removal, wherein the seed will be directed towards the ground, such as via gravity or via a seed delivery system. The projections 212 can take different shapes and/or configurations, and are not required in all embodiments.

Positioned generally radially outwardly from the seed path is a curbed rim portion or flange 208. The curved rim 208 is an arched feature that curves axially from the seed side and away from the air side 216 of the disc 200. The curvature of the outer portion 208 of the disc 200 coincides generally with a brush wheel such that the brush wheel is able to rotate along with the curvature of the profile of the disc. The curvature 208 is shown best in FIG. 7 of the present disclosure and apexes generally at an outer rim 206.

Figure 4:
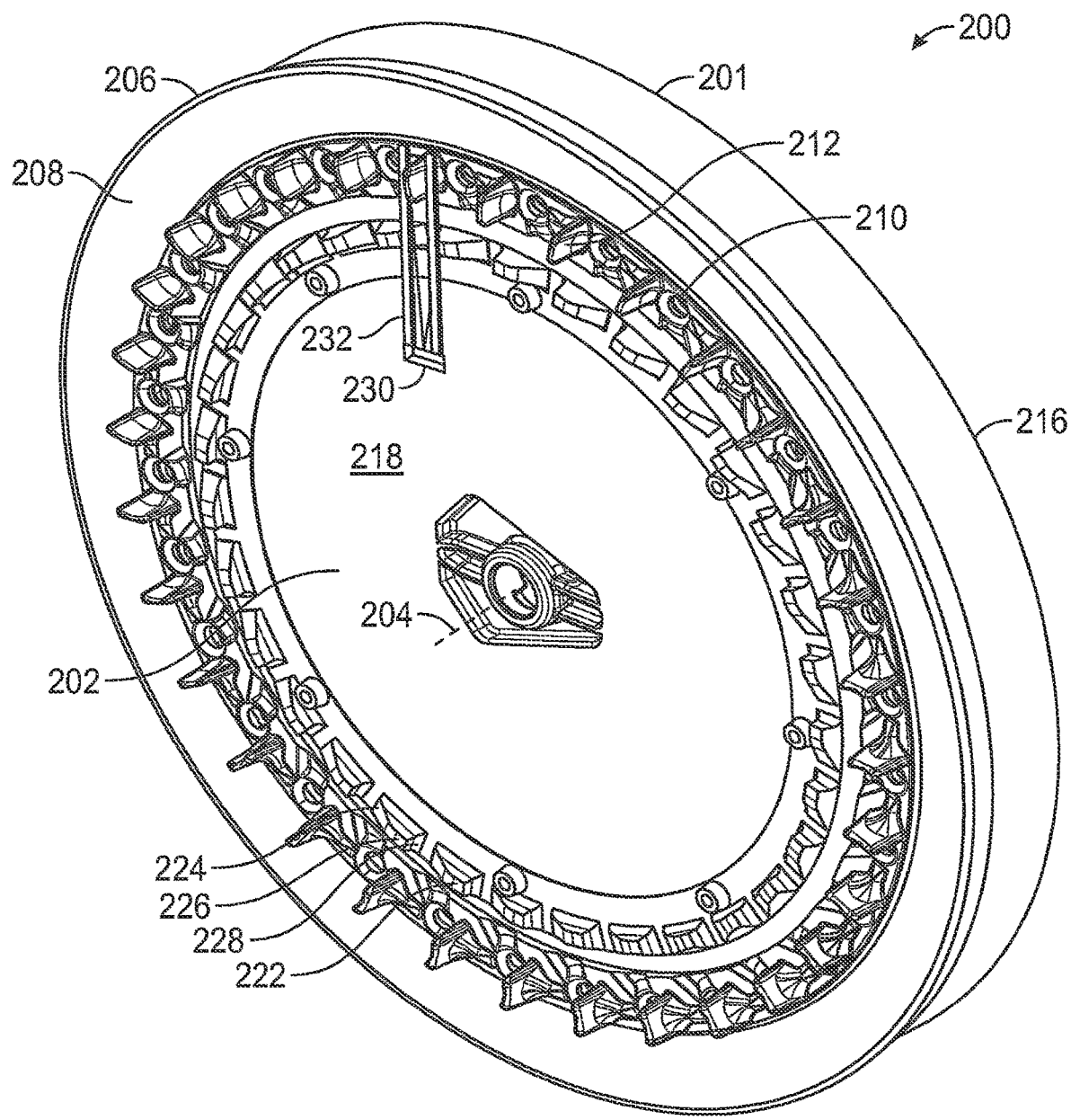
FIG. 4 is an isometric view of a seed disc according to aspects of some embodiments of the present disclosure.

As further shown in the figures, and in particular, FIGS. 4 and 7, the disc 200 has a sidewall extending from the outer rim 206 axially towards the air side 216 of the disc 200. This sidewall creates a pocket of sorts for the pressure to be applied to the full seed path comprising the seed cell apertures 210. The length of the sidewall, and thus, the thickness of the disc 200 can vary according to seed type, disc size, and/or other considerations.

Figure 5:
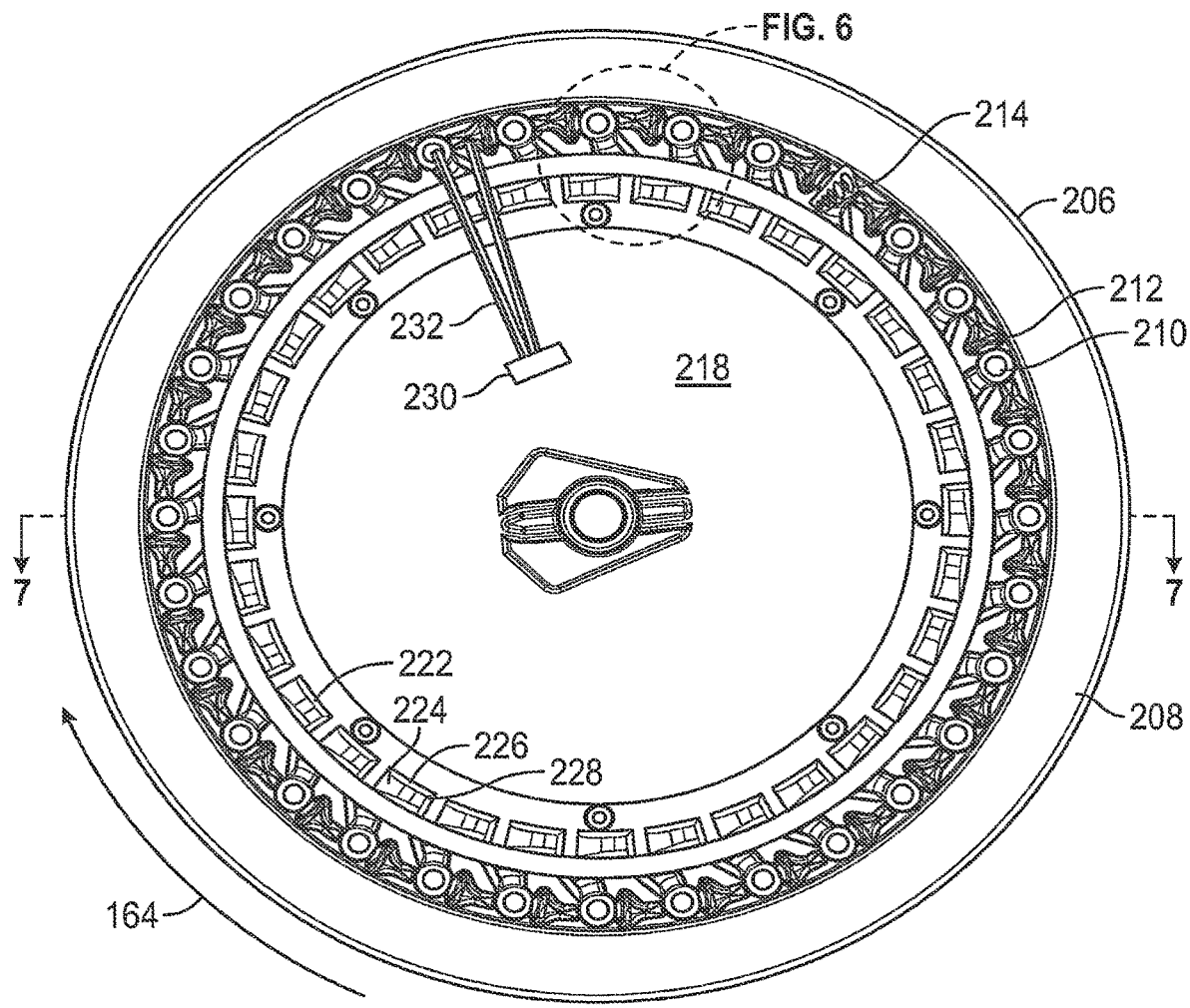
FIG. 5 is a front elevation view showing the seed side of the seed disc of FIG. 4.
Figure 6:
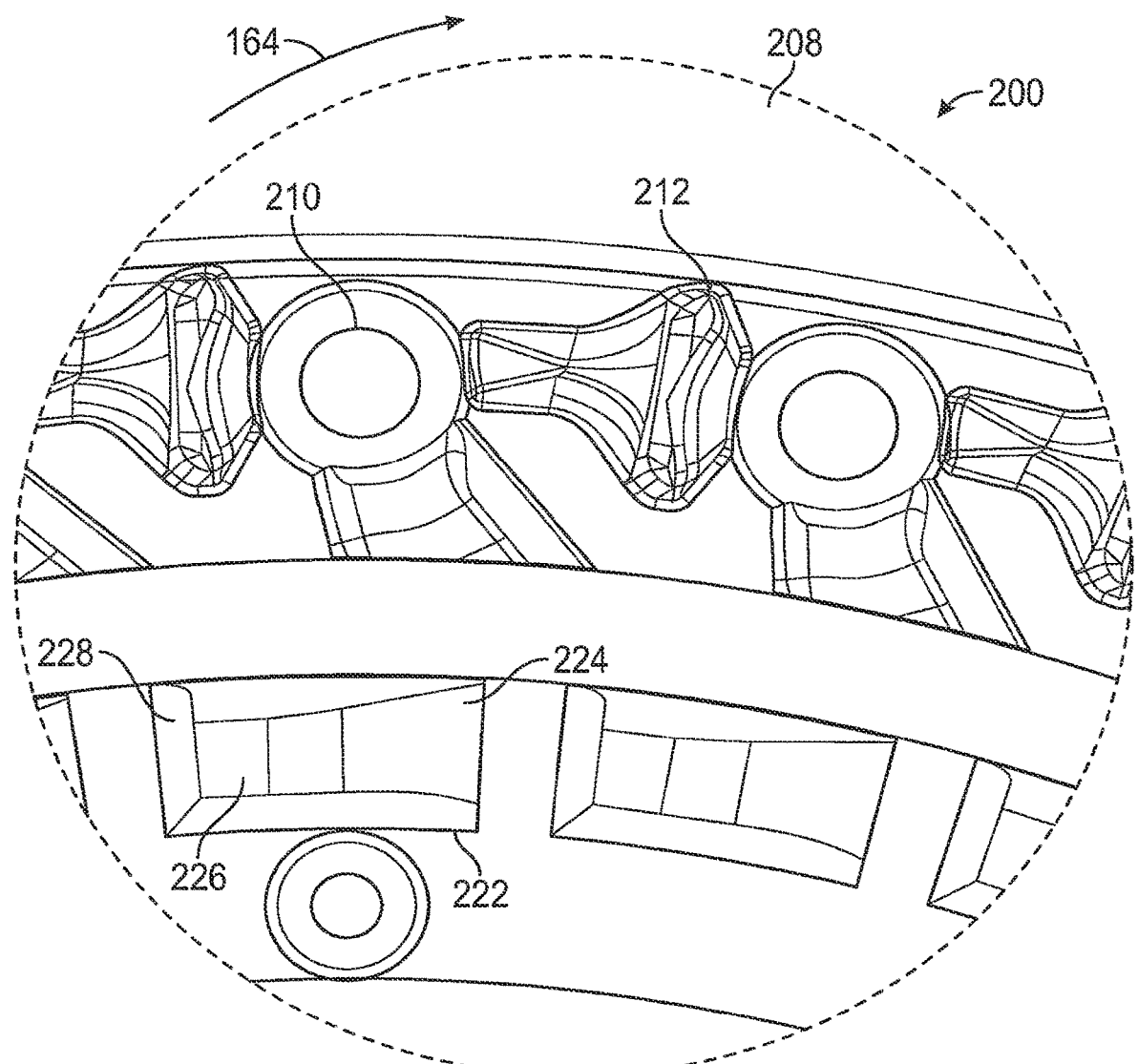
FIG. 6 is an enlarged view of a portion of the seed disc.

Also shown in the figures, and in particular, FIGS. 4 and 5, is a seed singulator 230 in the form of a brush singulator. The brush singulator comprises one or more tufts 232 extending from a base. It should be noted and appreciated that while the brush style singulator is shown, any type of singulator, including brushes, blades, ramps, protrusions, or some combination thereof, should be considered a part of the present disclosure. The base is positioned generally radially inward of the seed path, and the one or more tufts 232 extend radially outward from the base toward the seed cell apertures 210. The tufts 232 comprise a flexible material, and may comprise a plurality of string like members. The tufts 232 are configured to interact with the seed 214 at the cells 210 and attempt to remove any multiple seeds that may be positioned at a single cell 210. The base and tufts are generally stationary relative to the rotating seed disc 200 and will be connected to a portion of the seed meter housing, but are shown in the figures with the seed disc 200 to give context to the interaction between the singulator and the seed cells. As noted, the tufts are compliant and will bend, move, or otherwise flex relative to the seed, seed projections, and otherwise, while brushing contact with the seed to singulate the same.

However, as further noted, seed is not ideally shaped to be held and singulated. Many seeds, including, but not limited to, sunflower, corn, cotton, edible beans, and the like, are irregularly shaped and it creates difficulty to ensure that a single seed is held at a seed cell 210 and singulation occurs prior to the delivery of the seed towards the ground.

Therefore, aspects of the present disclosure include the addition of ramps 222 with the seed disc 200. The ramps 222, as shown in FIGS. 4-8, are positioned radially inward can have outboard ramps as well from the seed cells 210 of the seed path. The ramps 222 may vary in number and location, but according to at least some aspects of some embodiments, the number of ramps coincide with the number of seed cells. Still further, according to at least some aspects of some embodiments, the ramps 222 are located radially in line with a corresponding seed cell 210, such that a radius line will pass through both a ramp and a cell. However, as noted, this is not required in all embodiments.

The ramps 222 comprise a rise 224, a landing 226 at an apex portion, and a rear or back end 228. The rise 224 comprises an angled or curved portion that extends generally from at or near the seed disc surface (such as the planar portion 218) and extends away from the disc towards the landing 226. The rear surface 228 drops precipitously from the landing towards the surface of the disc 200. The rise 224 of the ramps 222 is positioned to face the direction of rotation of the disc 200.

As shown in the figures, a number or series of sequential ramps are provided around the disc 200. The ramps 222 can be formed integrally with the disc, such as in the molding or other manufacture thereof, or can be added as a ring insert. For example, the disc 200 could include a groove in the surface, such as the planar surface 218, and a ring insert with the ramps 222 could be added in the groove to position the ramps therein. Furthermore, as noted, the number, size, and/or other configurations of the ramps 222 could vary.

The ramps 222 provide numerous advantages and/or improvements to the disc to provide better singulation and delivery of seeds via the seed disc 200. The ramps 222 may act as an agitation and orientation member as the seed disc 200 rotates through a seed pool to urge seed toward and into engagement with a seed cell aperture 210. In addition, the ramps 222 can engage and interact with the tufts 232 of the singulator 230 to better singulate the irregularly shaped seed. As the seed disc 200 rotates with seed 214 adhered at a seed cell 210, there may still be multiple seeds at the seed cell, or the seed may not be ideally oriented to be held/adhered until the point of direction towards the ground.

The ramps 222 and tufts 232 of the singulator will work together to orient, or reorient, the seed at the seed cells 210, in addition to removing plural seeds thereat. The orientation of the seeds via the tufts and ramps will better position the seeds to ensure better delivery of the same.

As the seed disc 200 rotates, such as the direction shown in FIG. 5, the tufts 232 will interact with the rise 224 of the ramps 222 and will ride up the ramp. The tufts 232 will engage the seed in the seed cells 210 to orient the seed relative to the cells, in addition to removing plural seeds therefrom. For example, the positioning of the tufts 232 via the ramps may stand up the seed to better hold the seed in adherence at the cells. The tufts 232 can engage the seed at multiple sides to essentially lift the seed to the desired orientation. The pressure difference will then hold the seed in said orientation, providing a better control of the seed as the disc 200 continues rotating to the point of removal/release of the seed.

Therefore, the combination of the ramps 222 and the singulator 230 provide numerous advantages and improvements, as has been included. The orientation of seed and the removal of unwanted multiples at a seed cell will better ensure that the seed is carried to the point of removal or release and directed towards the ground in the desired location to provide the best opportunity for the seed to grow in the best conditions.

From the foregoing, it can be seen that the invention accomplishes at least all of the stated objectives. It should be appreciated that variations, alternatives, or otherwise that are obvious to those skilled in the art should be considered part of the disclosure. Furthermore, it should be appreciated that any combination of any of the aspects of any of the embodiments, even those not explicitly shown, are to be considered a part of the disclosure.

The invention claimed is:

1. A row unit for use with an agricultural planting implement, comprising:
   an air seed meter comprising a housing;
   a seed disc rotatably positioned in the housing, the seed disc comprising:
      a circular member comprising a seed side and a pressure side and having an axis for rotation;
      a plurality of radially spaced seed cell apertures comprising a seed path and extending from the seed side to the pressure side;
      a curved portion radially external the plurality of seed cell apertures; and
      a plurality of ramps radially inward of the seed path and spaced about the axis, the plurality of ramps extending axially from the seed side of the circular member;
   a singulator in the seed meter housing and comprising at least one member extending radially outward from the seed disc axis, the at least one member configured to interact with the plurality of ramps to singulate seed at the seed cell apertures;
   a rotating brush in communication with the curved portion of the seed disc to receive seeds from the seed meter; and
   a conveyor in communication with the rotating brush to receive seeds from the rotating brush, the conveyor ejecting the seeds proximate to the ground with a horizontal velocity component being approximately zero relative to the ground.

2. The row unit of claim 1, wherein:
   the seed disc rotates about a seed disc axis that is generally aligned with a direction of travel for the row unit; and
   the rotating brush rotates about a brush axis that is generally horizontal and transverse to the seed disc axis.

3. The row unit of claim 1, wherein the conveyor comprises a flighted belt within a conveyor cover.

4. The row unit of claim 1, wherein the seed disc further comprises a substantially planar portion extending from a central axis and radially to the curved portion.

5. The row unit of claim 1, wherein the number of ramps is equal to the number of seed cell apertures.

6. The seed disc of claim 1, wherein each of the plurality of ramps comprises a rise, a landing, and a rear face, wherein the rise faces a direction of rotation of the seed disc.

7. The seed disc of claim 6, wherein the rear face comprises a steeper angle relative to a face of the seed disc than the rise.

8. The seed disc of claim 1, further comprising a plurality of seed projections extending axially from the seed side of the circular member, said seed projections positioned between subsequent seed cell apertures.

9. The seed disc of claim 1, wherein the plurality of ramps are integral with the circular member.

10. The seed disc of claim 1, wherein the plurality of ramps comprise a ring insert that is removably attachable to the seed side of the circular member.

11. The air seed meter of claim 1, further comprising a vacuum source operatively connected to the pressure side of the seed disc.

12. The air seed meter of claim 11, further comprising an electric motor operatively connected to the seed disc to rotate the seed disc in the housing.

* * * * *